United States Patent
Viger et al.

(10) Patent No.: US 8,086,691 B2
(45) Date of Patent: Dec. 27, 2011

(54) METHOD AND DEVICE FOR EXCHANGING DATA BETWEEN MOBILE STATIONS IN A PEER TO PEER NETWORK

(75) Inventors: Pascal Viger, Coesmes (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 1301 days.

(21) Appl. No.: 11/434,168

(22) Filed: May 16, 2006

(65) Prior Publication Data

US 2006/0271688 A1   Nov. 30, 2006

(30) Foreign Application Priority Data

May 24, 2005   (FR) ...................................... 05 05213

(51) Int. Cl.
G06F 15/16   (2006.01)
(52) U.S. Cl. ........................................................ 709/217
(58) Field of Classification Search ................. 709/202, 709/203–207, 217–223, 227–239
See application file for complete search history.

(56) References Cited

U.S. PATENT DOCUMENTS

| | | | |
|---|---|---|---|
| 6,029,195 A * | 2/2000 | Herz | 725/116 |
| 2002/0021591 A1 | 2/2002 | Grosvenor et al. | 386/124 |
| 2003/0058275 A1 | 3/2003 | Pilu et al. | 345/751 |
| 2003/0078939 A1 | 4/2003 | Ma | 707/104.1 |
| 2004/0184478 A1 | 9/2004 | Donescu | |
| 2005/0044146 A1 | 2/2005 | Nassor | |
| 2005/0044483 A1 | 2/2005 | Maze | |
| 2005/0198118 A1 | 9/2005 | Viger | |
| 2005/0228753 A1 | 10/2005 | Viger | |
| 2005/0278389 A1 | 12/2005 | Maze | |
| 2006/0059160 A1 * | 3/2006 | Smola et al. | 707/10 |
| 2007/0053513 A1 * | 3/2007 | Hoffberg | 380/201 |
| 2008/0134258 A1 * | 6/2008 | Goose et al. | 725/91 |
| 2010/0137036 A1 * | 6/2010 | Bucher et al. | 455/566 |
| 2011/0153785 A1 * | 6/2011 | Minborg et al. | 709/219 |

FOREIGN PATENT DOCUMENTS

| | | |
|---|---|---|
| EP | 1 133 104 A2 | 9/2001 |
| EP | 1 133 104 B1 | 6/2004 |
| EP | 1 499 089 | 1/2005 |

* cited by examiner

Primary Examiner — Asad Nawaz
(74) Attorney, Agent, or Firm — Fitzpatrick, Cella, Harper & Scinto

(57) ABSTRACT

In order to share digital data in a peer to peer communication network, a partial version of the data is firstly transmitted to destination stations, and: a collection of data is created in which an identifier is associated with each data item and to each data identifier there is allocated a label indicating whether the complete version of the data item is available on the network; the existence of the collection is notified to at least one destination station; and, on the reception of information on availability on the network of the complete versions of the data of the collection: the collection is updated; and the updating of the shared collection is notified to the destination station or stations.

22 Claims, 9 Drawing Sheets

METHOD AND DEVICE FOR EXCHANGING DATA BETWEEN MOBILE STATIONS IN A PEER TO PEER NETWORK

The present invention relates to a method and device for exchanging data between mobile stations in a peer to peer network.

The invention belongs to the field of the sharing of multimedia digital data and access to such data in a distributive communication network. It applies to any single- or multi-resolution digital document.

Throughout the remainder of this document, the term <<version>> of a data item designates the data item at a particular resolution. The original data item has the highest resolution and the same data item at a lower resolution is referred to as either <<thumbnail>> or <<thumbnail image>>.

In a peer to peer file exchange system, each peer can be both client and server. This means the data received by a peer fulfilling the role of client can be served to other users by this same peer fulfilling the role of server. Data to which many persons have access may therefore be replicated on several machines and be served by several servers.

An important particularity of peer to peer systems is that their topology is generally very unstable. This is because the client stations (and consequently the servers) can be connected to it and disconnected from it at any time. In such an environment, access to the contents in the communication network represents a challenge with regard to size. The stations in a P2P system are in general computers connected in a network by means of the Internet with various means (PSTN, ADSL, etc.).

A so called hybrid peer to peer system has the particularity of comprising a permanent server, referred to as the central server, which can serve for the registration of users and for the management of the connection of the client machines of these users. For the purpose of increasing the availability of the digital data on the peer to peer network and thus promoting the quality of broadcasting service, the central server can also temporarily store limited versions of personal digital data.

The context of the invention is more precisely a communication system exchanging digital data by means of digital containers of these data.

The present invention will be described here by way of in no way limiting example in an application where the digital data, whether it is a question of photographs, images or videos, can be represented in hierarchical storage format of multiple representations, in terms of resolution and memory size.

A digital container of such data is for example a collection of digital photographs, that is to say a container of references to these images, various sub-parts or representations of which can be found on various machines in the network.

More and more usually, so called <<lightweight>> client stations are appearing, such as digital cameras or personal assistants (PDAs) having connection to the Internet (for example a wireless connection of the WiFi type): these are able to send digital data to be shared on the P2P network but, because of their limited capacities, they cannot be considered as servers of these data.

This is because a user of a digital camera wishing to share with his friends the photographs that he has just taken will be confronted with significant problems of communication cost and time. Solutions will consist of sending immediately only a limited version of the data to be shared, for example a thumbnail of a photograph, and sending the original version at a later stage by other means: for example, this same person returns home and synchronizes the camera with his computer, which is then able to send the original version of the image over the P2P network. In this case, the recipients will have received firstly a glimpse of the photograph and then secondly the original version.

In the context of a hybrid P2P network, if one or more users are seeking original data on the network, following the reception of a thumbnail, when these original data are not yet available, this gives rise to serious consequences for the network, such as an unnecessary overloading of the P2P network and an obstruction of the search requests on the central server.

Through the document EP-A-1 133 104 a method of transferring images from a camera to a destination through a server system is known.

When photographs are taken, to allow a less expensive distribution of the images to the server, the mobile device generates a low-resolution version of the original photograph.

The second step consists of sending the low-resolution versions of the photographs to the server, passing through the radio connection. Next the server will be responsible for routing to the destinations in the network.

After having viewed the thumbnail, each destination can if necessary indicate to the server its wish to obtain the high-resolution original immediately or later.

Finally, following this information, a transfer of the original photograph is effected, either directly or indirectly, passing through the server, to the destinations that requested the original photograph.

This image transfer method has several drawbacks. First of all, no account is taken of the case where the mobile device is no longer present for the time of the response from the destinations for obtaining the high-resolution image.

In addition, no account is taken of the case of re-sharing of the same image.

Moreover, there is no concept of change of state of the shared data.

Moreover, through the document US-A-2003/0021591, a method is known for exchanging digital photographs between persons present at the same place.

After the photographs are taken, a synchronization signal is transmitted so that all the cameras know the database where the photographs taken will reside. The camera that took the photograph connects to this database and transfers its images to it. All the other camera owners can then download the images.

The database can be produced by a connected camera (memory of the camera), by a computer (hard disk containing the photographs) or by an accessible Web server.

There is no indication of the actual presence of data in the system. This method does not therefore prevent a user making a search on the network for versions of data which are not yet introduced into the network.

The aim of the invention is to remedy the drawbacks mentioned above, on the one hand by permitting the sharing of partial digital data coming from a lightweight client in a P2P network, in the case where a person wishes to inform his destination friends rapidly of the sharing of his new images, and on the other hand preventing searches of versions of the digital data that are not yet present in the network: it is legitimate for the destination of a sharing to wish to receive better resolutions of the images/documents but this must not impair the performance or quality of service of the network in general and of the central server in particular.

For this purpose, the present invention proposes a method of sharing digital data in a peer to peer communication network, according to which a partial version of the shared data is firstly transmitted to stations for which these data are intended, this method comprising steps according to which:
- a collection of data is created, in which an identifier is associated with each data item and there is allocated to each data identifier a label indicating whether the complete version of the data item is available on the network;
- the existence of this collection is notified to at least one destination station; and on reception of information about the availability on the network of complete versions of the data of the collection:
- the collection is updated; and
- the updating of the shared collection is notified to the destination station or stations.

The present invention thus makes it possible to obtain a significant reduction in the cost of the service of a central server implementing these steps. This is because, firstly, no search is made for data that are not yet introduced into the network and secondly the impact of a double notification is minor compared with the load saved on the server in terms of processing time and bandwidth.

In addition, the present invention results in great simplicity for the users: there is no specific action for the peer sharing the data; with regard to the receiver of the collection, he is informed of the reason why no search will be made on the data item requested (namely the fact that this data item is not yet present in the network).

In addition, the present invention makes it possible to reduce the waiting of a destination of a shared collection, preventing him from making searches for contents absent from the network.

The present invention also makes it possible to prevent the implementation of expensive methods of propagating information on the network.

Moreover, the solution proposed by the present invention is compatible with the security protocols in force in the network.

In addition, major transfers of data are always made over the least expensive channels.

In a particular embodiment, the collection of data consists of:
- a header, comprising a title, a collection identifier and an identifier of the author of the collection, and
- a body, comprising a plurality of identifiers of the digital data of the collection, and a plurality of labels respectively associated with the identifiers of the data, each label indicating whether the complete version of the data item is available on the network.

The presence of the labels in the body of the collection makes it possible to preserve a unique means of transferring useful information on the media contents, since this avoids using an alternative file dedicated to a media content.

According to a particular characteristic, the header of the data collection also comprises a signature.

The signature makes it possible to verify that the collection has indeed been created by the author designated by the identifier included in the header of the collection and that the collection has been validated by the authentication server of the peer to peer network.

A central server can for example serve as an authentication server in accordance with the security protocol of the peer to peer network, since this server manages the accounts of the users. The signature is for example made up on the central server with the proper private enciphering key of the central server.

In order to validate a signature, a client can either have available the public key corresponding to the private key which was used to sign the collection, in which case he can decrypt the signature and compare the value obtained with his own collection signature calculation, or have recourse to the central server for validating the signature.

According to a particular characteristic, the body of the collection of data also comprises a plurality of identifiers for users authorized to access the collection.

In a secure peer to peer network, the creator of the collection thus creates a limitation on access to the contents of the collection, allowing only persons whose user identifier is written in the list of collection user identifiers. In a variant, in a non-secure peer to peer network, or if the collection does not have a signature, this list of user identifiers is considered to be a broadcast list for the media data of the collection.

In a particular embodiment, each label is a flag whose presence indicates that the complete version of the corresponding data item is not available on the network and whose absence indicates that the complete version of the data item is available on the network.

The flag indicates a transient state of the collection, in which the high-resolution versions of the data are not yet present on the network. Next, there is no more reason to keep this flag, which makes it possible to alleviate both the memory size used for the collection and the processing made by the peers during the syntax analysis (called "parsing") of the collection.

In another particular embodiment, each label is a Boolean whose value indicates the presence or absence of the corresponding data item on the network.

In a particular embodiment, the step of updating the collection consists of eliminating the labels corresponding to the data whose complete version is available on the network.

This makes it possible to alleviate both the memory size used by the collection and the processing used by the peers during the parsing of the collection.

In a preferred application of the invention, the data represent fixed digital images and the partial version of a data item is a version of an image having a resolution lower than that of the original image.

In another preferred application of the invention, the data represent a digital video and the partial version of a data item is the first image of the video at a resolution lower than that of the original video.

In a particular embodiment, the steps of the method are implemented by a central server.

This embodiment is advantageous since the central server, continuously connected, is available for all the clients in the peer to peer network. It also has available all the information necessary for the creation of a collection of digital documents (management of user accounts, authentication server, temporary storage of certain versions of the shared data). When it is connected to the Internet, for example by means of a wireless relay terminal, a compatible mobile device can communicate with the central server at any time.

In a particular embodiment, the data collection is created on reception of a request to share digital data coming from a mobile station.

The collection thus created capitalizes the information received from the mobile station, which is then transmitted in a format that can be used by the peer systems in the network. The collection also if necessary preserves the information on the partial presence on the network of the shared data coming from a mobile station.

In this embodiment, the reception of information on availability on the network of the complete versions of the data takes place after connection of the aforementioned mobile station with a peer station of the network and on synchronization of the collection between this mobile station and this peer station.

Thus the mobile station uses a local connection, fast and inexpensive, to transmit the high-resolution versions of the shared digital data such as images. The peer station then informs the peer to peer network of the availability of these versions in its storage area dedicated to the peer to peer service.

In another particular embodiment, the data collection is created on reception of a request to share digital data coming from a first peer station in the network.

The first peer station creates the collection and sends it to the central server. If this first peer station is solely used for the purpose of notifying the creation of a collection and is not intended to serve as a relay for serving the shared digital documents, the collection can be destroyed locally on this peer station after sending to the server. The advantage consists of informing the destinations of a shared collection as quickly as possible, even if all the versions of the documents are not yet recoverable.

In this other embodiment, the reception of information on availability on the network of the complete versions of the data takes place after complete versions of the data are made available by a second peer station in the network.

In the case where the second peer station possesses capabilities of connection to the network that are better than the first peer station, the invention makes it possible to take advantage of this. The high-resolution versions are made available on the peer to peer network from this second station.

In a variant, the reception of information on availability on the network of the complete versions of the data takes place after complete versions of the data are made available by the first peer station after a predetermined time.

Thus, at the start of the sharing of the data, the user of the peer station can favor the bandwidth for other services than the peer to peer network. Later, when he wishes, the sharing of the collection can be finalized—in the meantime the destinations will have had available a pre-display of this still partial collection.

In a particular embodiment, the steps of creating the collection and of notification of the existence of the collection are used by a mobile station, the steps of updating the collection and notification of updating of the collection being made by a peer station in the network or by a central server.

Mobile devices have means for creating collections of data but have inefficient and/or expensive connection capabilities. Their CPU capabilities are used in order to take the load off the central server.

In this embodiment, the reception of information on the availability on the network of the complete versions of the data takes place after connection of the aforementioned mobile station with a peer station in the network and on synchronization of the collection between this mobile station and this peer station.

In this embodiment, the collection of data is created on reception of a request to share digital data coming from a second mobile station.

Two mobile stations have exchanged digital data with each other; if the first mobile station has sufficient processing capacities to create a temporary collection, it does so. Otherwise the collection is created on a peer station of the network after connection of the first mobile station with this peer station and on synchronization between this mobile station and this peer station.

In this case, the reception of information on the availability on the network of the complete versions of the data takes place after connection of the aforementioned second mobile station with a peer station in the network and on synchronization of the collection between this mobile station and this peer station.

In a particular embodiment, the steps of creating the collection and of notifying the existence of the collection are implemented by a peer station in the network, the steps of updating the collection and notification of updating being performed by another peer station in the network.

In a particular embodiment, all the steps of the method are implemented by a peer station in the network.

For the same purposes as that indicated above, the present invention also proposes a method of sharing digital data in a peer to peer communication network, according to which there is transmitted, to stations that are destinations of these data, firstly, a partial version of the shared data, this method comprising steps according to which, at a destination station: on reception of a notification indicating the existence of a collection of data comprising an identifier associated with each data item, a label having been allocated to each data identifier in order to indicate whether the complete version of the data item is available on the network, the labels associated with the data identifiers of the collection are analyzed;

in the case of the existence of labels indicating that the complete version of a data item is not available on the network, the processing rights associated with this data item are restricted; and on reception of a notification of updating of the collection, the restriction of the processing rights is eliminated.

According to a particular characteristic, the method also comprises a step of displaying restrictions on the processing rights.

Thus the user knows, by consulting the graphical interface, that the commands are limited, which prevents him attempting various commands in vain.

The restriction of the processing rights may be a prohibition on requesting a complete version of the data item and/or a prohibition on printing the data item if the data item is an image and/or a prohibition of a new sharing of this data item.

Still for the same purpose, the present invention also proposes a device for sharing digital data in a peer to peer communication, in which the destination stations of these data are adapted to receive, firstly, a partial version of the shared data, this device comprising:

a unit for creating a collection of data, in which an identifier is associated with each data item and a label is allocated to each data identifier, this label indicating whether the complete version of the data item is available on the network;

a first notification unit, for notifying the existence of the collection to at least one destination station;

a unit for updating the collection; and a second notification unit for notifying to the destination station or stations the updating of the shared collection.

Still for the same purpose, the present invention also proposes a device for sharing digital data in a peer to peer communication network, in which stations for which these data are intended are adapted to receive, firstly, a partial version of the shared data, this device comprising, at a destination station:

an analysis unit for analyzing, on reception of a notification indicating the existence of a collection of data comprising an identifier associated with each data item, a label having been allocated to each data identifier in order to indicate whether the complete version of the data item is available on the network, the labels associated with the collection data identifiers;

a restriction unit, for restricting the processing rights associated with the aforementioned data item in the case of the existence of labels indicating that the complete version of a data item is not available on the network; and a restriction elimination unit, for eliminating the restriction of the processing rights on reception of a notification of updating of the collection.

Still for the same purpose, the present invention also proposes a data server in a peer to peer communication network, comprising:

a data storage unit;
a Web server;
a display interface, coupled to the Web server, and
a data-base, this server being adapted to execute software implementing a method as above.

The present invention also relates to an information storage means that can be read by a computer or a microprocessor storing instructions of a computer program, for implementing a method as above.

The present invention also relates to a partially or totally removable information storage means that can be read by a computer or a microprocessor storing instructions of a computer program, allowing the implementation of a method as above.

The present invention also relates to a computer program product that can be loaded into a programmable apparatus, comprising sequences of instructions for implementing a method as above, when this program is loaded into and executed by the programmable apparatus.

The particular characteristics and the advantages of the device, of the data server, of the storage means and of the computer program product being similar to those of the method, they are not repeated here.

Other aspects and advantages of the invention will emerge from a reading of the following detailed description of particular embodiments, given by way of non-limiting examples. The description refers to the drawings that accompany it in which.

The detailed description that follows is based on an example of an optimum system where the central server keeps only low-resolution versions, namely at least the thumbnails, of the digital data.

Amongst the various types of digital files to which the present invention can apply, there are:

fixed digital images whose low-resolution representation is a thumbnail or thumbnail image and where the original data item corresponds to the original image, that is to say at full resolution;

a video, where the original data item corresponds to the sequence of original images and the thumbnail corresponds for example to the first image of the video at a resolution lower than the resolution of the original video. The start of a video stream can also for example represent a thumbnail description of the complete video;

computer files of office application (often the first bytes of these files make it possible to know the type of software application required to read them, and thus the user for whom the sharing is intended can choose those of the files that he is able to display).

In a preferred embodiment, the multi-resolution data shared by the invention are digital images or photographs.

Figure 1:
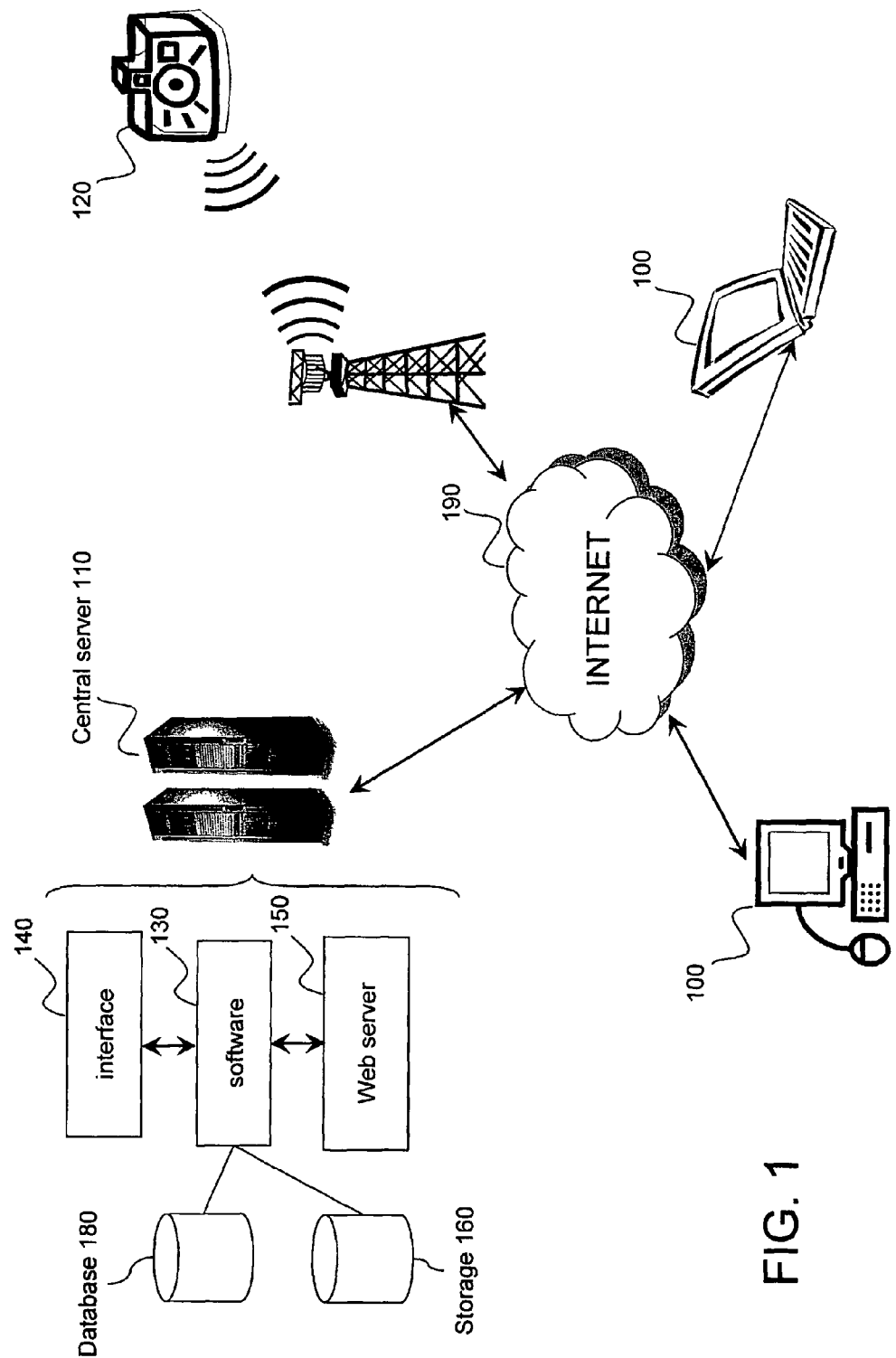
FIG. 1 depicts schematically a peer to peer or P2P network adapted to implement the present invention, in a first particular embodiment.

An overall view of a peer to peer network adapted to implement the present invention is illustrated in FIG. 1.

A network 190 such as the Internet allows communications according to an architecture of the client-server type, where each client 100 or 120 periodically accesses a central server 110.

Peer to peer connections amongst the computer appliances 100 of the users are also made in order to exchange data to be shared, and this independently of the central server 110. The users can connect to the network in various ways: for example by means of DSL, 56 k, or cable modems, but also from mobile telephone stations (for example of the GSM type) or from nomad stations having a wireless connection (for example of the WiFi type). The network 190 can also be a private local network (LAN).

The central server 110 can be composed of several servers coupled together and accessible from a single network address.

The terminals 100 can communicate directly or by means of the central server 110. Each server 110 can for example be a device as described below in relation to FIG. 2, and comprises in particular a volatile data storage device 160 (a cache memory is spoken of, which can contain data with a long life such as images, but also more volatile data such as address lists), and a man-machine interface that allows interaction with an administrator of this server.

Figure 2:
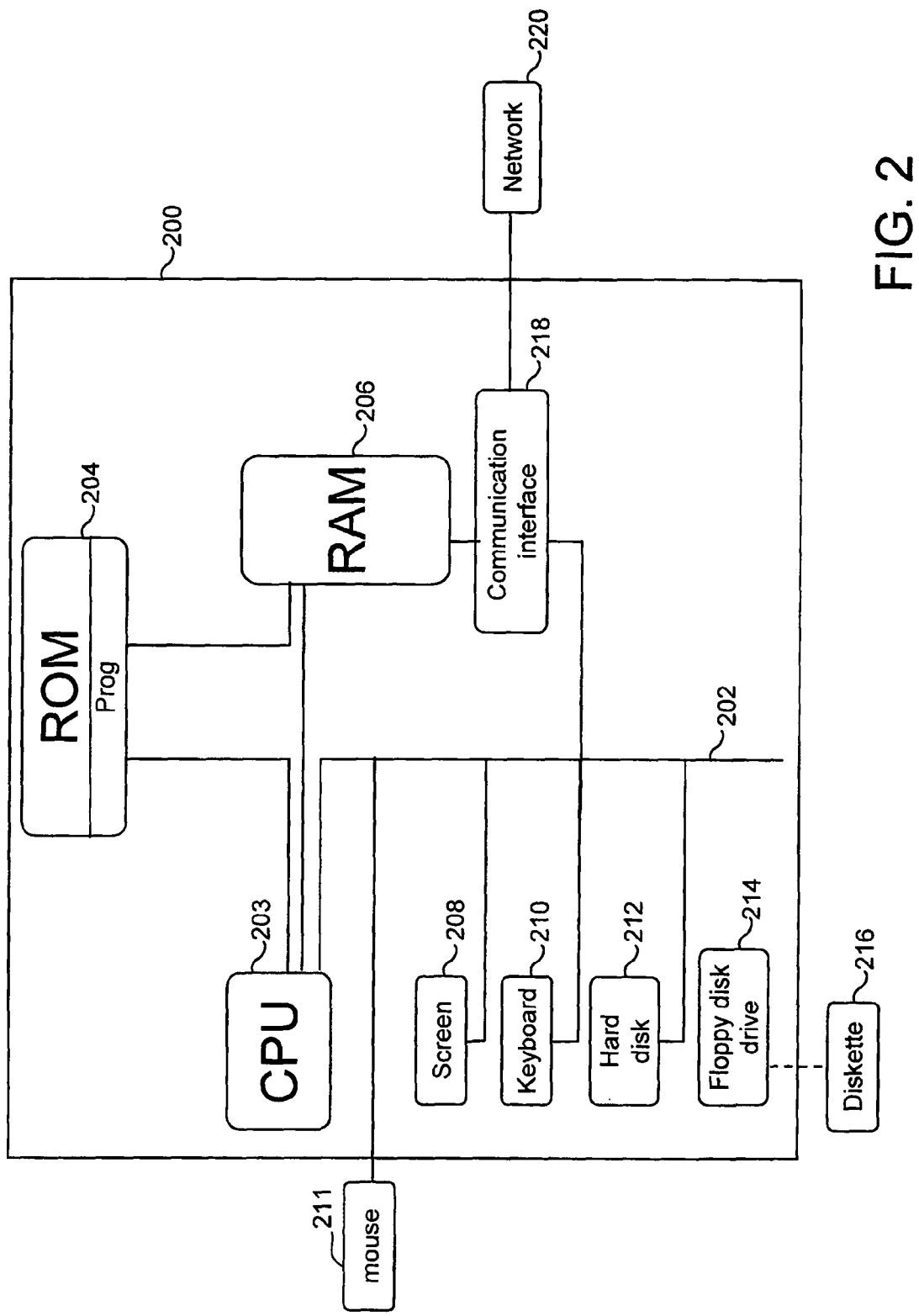
FIG. 2 depicts schematically a device adapted to implement the present invention, in a particular embodiment.

Each terminal 100 can also be a device as described in FIG. 2. The terminals 100 can be connected to various peripherals such as a digital camera or a scanner or any image acquisition or storage means supplying multimedia data.

The terminals 120 are more particularly lightweight clients, such as a digital assistant or a camera or a portable telephone, having a connection to the network 190. If they do not internally possess image acquisition or storage capacities and means, these appliances 120 can be connected to various peripherals such as for example a digital camera. Generally these terminals 120 are connected to the network 190 by means of a mobile telephone network (for example of the GSM type) or by relay terminals of a local wireless network of the WiFi or Bluetooth type.

The central server 110 can execute an application, illustrated in FIG. 1 by the software 130, which encompasses the algorithms of the invention. The central server 110 comprises a display interface 140, which may correspond to an Internet browser. This interface is coupled to a Web server 150. The Web server 150 is a conventional server (such as Apache or Microsoft IIS) executing software modules 130 peculiar to the invention.

In a variant, the software 130 and the server 150 can constitute one and the same entity.

As indicated above, the central server 110 is also composed of a storage device such as a hard disk 160, on which there will be stored the data to be kept temporarily (in particular the thumbnails relating to the digital photographs to be shared), and a database 180 containing unique identifiers peculiar to various entities of the global system (in particular the identifiers of the users and the identifiers of the images).

A device implementing the present invention is illustrated in FIG. 2. The central server 110 and the terminals 100 can be in accordance with the following description.

This device may for example be a microcomputer 200 or a workstation. This device is connected to various peripherals such as for example any image storage means connected to a graphics card and supplying multimedia data to the device 200.

The device 200 comprises a communication bus 202 to which there are connected:

- a central processing unit (microprocessor) 203,
- a read only memory 204, which may contain programs "Prog" according to the invention,
- a random access memory 206 (cache memory), containing registers adapted to record variables and parameters created and modified during the execution of the aforementioned programs,
- a screen 208 for displaying data and/or serving as a graphical interface with the network administrator, who will be able to interact with the programs according to the invention by means of a keyboard 210 or any other means such as a pointing device, such as for example a mouse 211 or an optical pen,
- a communication interface 218 connected to a distributive communication network 220, for example the Internet, the interface being able to transmit and receive data.

The device 200 can also comprise, as an option:

- a hard disk 212 able to contain the aforementioned programs "Prog",
- a floppy disk drive 214 adapted to receive a diskette 216 and to read or write thereon data processed or to be processed in accordance with the present invention.

The communication bus 202 allows communication and interoperability between the various elements included in the microcomputer 200 or connected to it. The representation of the bus is not limiting and in particular the central unit 203 is able to communicate instructions to any element of the microcomputer 200 directly or by means of another element of the microcomputer 200.

The executable code of each program enabling the device 200 to implement the processes according to the invention can be stored for example on the hard disk 212 or in read only memory 204.

In a variant, the diskette 216 can contain data as well as the executable code of the aforementioned programs which, once read by the device 200, will be stored on the hard disk 212.

In another variant, the executable code of the programs can be received by means of the communication network 220, via the interface 218, in order to be stored in an identical fashion to that described previously.

The diskettes can be replaced by any information medium such as, for example, a compact disk (CD-ROM) or a memory card. In general terms, an information storage means that can be read by a computer or a microprocessor, integrated or not into the device 200, possibly removable, is adapted to store one or more programs whose execution allows the implementation of the method according to the present invention.

In more general terms, the program or programs can be loaded in one of the storage means of the device 200 before being executed.

The central unit 203 controls and directs the execution of the instructions or portions of software code of the program or programs according to the invention, instructions that are stored on the hard disk 212 or in the read only memory 204 or in the other aforementioned storage elements. On powering up, the program or programs that are stored in a non-volatile memory, for example the hard disk 212 or read only memory 204, are transferred into the random access memory (RAM) 206, which then contains the executable code of the program or programs according to the invention, as well as registers for storing the variables and parameters necessary for implementing the invention.

It should be noted that the communication apparatus comprising a device 200 according to the present invention may also be a programmed apparatus. This apparatus then contains the code of the computer program or programs for example fixed in an application specific integrated circuit (ASIC).

Figure 3:
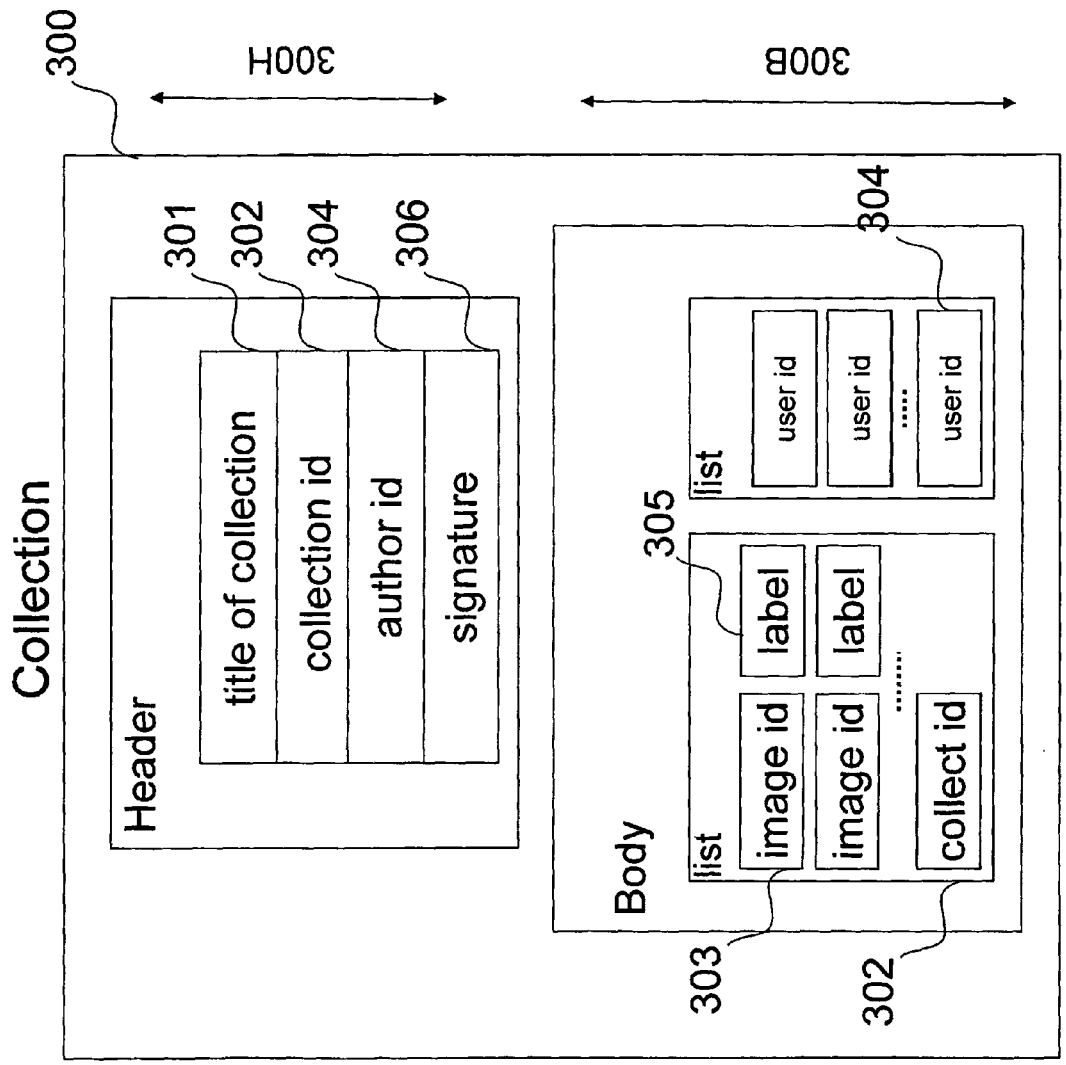
FIG. 3 illustrates a collection within the meaning of the present invention, in a particular embodiment.

FIG. 3 illustrates a collection 300 within the meaning of the present invention, that is to say a set of references relating to media contents (image, video, sound) with associated information, commonly referred to as <<metadata>>. These metadata are for example information relating to a media content such as a comment, the original resolution of an image, the compression ratio of a video, etc. A media content may be a metadata item of another media content. There may also be metadata for the collection itself, such as the title of the collection, its author, a date, etc.

By extension, a collection may contain collections, referred to as sub-collections.

The following description relates to the case of the sharing of a collection of digital images by an archiving system of a terminal 100 or 120 in a network of the peer to peer type. In this context, the term <<thumbnail>> is given to the low-resolution version of a digital image and <<image >> to the high-resolution version of this digital image, it being understood that the present invention is in no way limited to only two resolutions.

Thus, hereinafter, the term "multi-resolution image" is applied both to digital images with a multi-resolution format (such as images to the JPEG2000 format) and single-resolution digital images (for example JPEG format). In this second case, the concept of multi-resolution is supported by the construction of independent files corresponding to different sub-resolutions obtained from the same high-resolution image file.

As shown by FIG. 3, each object corresponding to a digital image is identified by an identifier 303, created on the machine of the user. This identifier is allocated by the client application even if the latter is not connected to the network. One solution consists of producing random numbers locally. Optionally, these identifiers can be unique in order to facilitate searches on the network. Tools well known to persons skilled in the art make it possible to generate identifiers with a minute probability of duplication.

Images will likewise be defined by an identifier 303 by the application of the client as soon as a new image is added to a collection. If the image is copied from an existing collection, it will preserve the original identifier.

However, a thumbnail has the same identifier as an image. In order to determine an object (image or thumbnail) precisely, the identifier 303 must be associated with a data <<typing>>: the majority of the time this typing is implicit according to the requests sent over the network (in the case of downloading, the image is requested whilst the image is useful for a simple display).

Each user also has a unique identifier 304 supplied by the central server during the user registration process. This property is useful for reducing to a minimum the risk of multiple registrations for the same user. In the preferred embodiment, by purchasing the client software, the purchaser registers his software and establishes with the central server 110 an account which identifies this user. This account identified by the identifier 304 serves both for a connection of the client by the standard software or by an Internet browser.

In the preferred embodiment described here, a collection 300 comprises on the one hand a header 300H and on the other hand a body 300B.

The header 300H comprises a title 301, an identifier 302 of the collection and the identifier 304 of the author of the collection.

A signature 306 for verifying that the collection was indeed created by the author and has been validated by the central server 110 may be added. The signature 306 is fabricated on the central server by a hash function known per se (for example, MD5) applied to the collection, then this signature is signed with the appropriate enciphering key of the server 110. To validate a signature, a client may either have available the public key corresponding to the key which was used to sign the collection (in this case he can decrypt the signature and compare the value obtained with his own calculation of the hash function applied to the collection), or have recourse to the central server to validate the signature. The creation of the signature is an operation known per se. Other metadata can be added, such as the date of creation, etc.

The body 300B comprises a list of identifiers 303 of the digital objects of this collection. The majority of peer to peer file exchange systems are intended for the exchange of public data: everyone can access a shared data item. In the context of personal data exchange (for example images or videos that a person wishes to share with his friends or family), it is necessary to have a system for restricting access to the data. In this case, the collection also contains a distribution list, that is to say a list of users authorized to view the collection, identified by identifiers 304.

With each identifier 303 of the body of the collection 300B there is associated a status 305 indicating a specific state of the data item identified by 303, corresponding to the presence/absence of a high-resolution version of the image on the P2P network. This state can be represented in several ways:

the status 305 is a flag: the presence of this flag indicates that the high-resolution version of the document is not available on the network. Its absence indicates no restriction during future requests on the element concerned since the high-resolution version is available somewhere in the network.

For example, in XML language, for an image:

```
<IMG>
    <CAPTION VALUE="my_first_image.jpg"/>
    <LABEL/>
</IMG>
``` the status 305 is a label attached to an element of the collection: the Boolean value allocated to this label indicates the presence or not of the high-resolution version of the element sought. By extension, the absence of this label is identical to a false value by default (<<false>>).

For example, for an image:

```
<IMG>
    <CAPTION VALUE="my_first_image.jpg"/>
    <LABEL VALUE="false"/>
</IMG>
```

It should be noted that this label is not limited to two values, but may comprise many integer values representing for example a degree of presence of various versions of documents available: this is because the partial presence of digital data on the network is directly a function of the capacities of the terminals 120 sharing these documents on the network (for example a high-performance camera 120 having a high-rate connection would be capable of initially introducing onto the network more intermediate-resolution versions of the shared documents).

Hereinafter, the term <<label>> will normally be used for designating the status 305. The label 305 will preferably not be mentioned in the collection if there is no restriction for access to any kind of version of the documents.

The creation of a collection by a user on a station 100 does not come under the invention. There exist methods well-known to persons skilled in the art which relate to the images and their association with image containers. For example, the user can copy an image from the graphical interface of the operating system of his computer and deposit it in the graphical interface 140 of the software implementing the invention.

The user can structure his images, collections and sub-collections so as finally to record each collection 300 created in the form of a list of image identifiers, of sub-collections. Each collection can possibly comprise one or more metadata of small memory size, for example a thumbnail representing the entire collection.

A collection can also comprise information (not shown in FIG. 3) for the rendition at the time of display (both for the P2P software executed on the peer stations and for display on the Web server 150 of the central server 110), such as: number of images per page, background image, image borders, etc.

For a collection created by a peer station 100, the presence of the label 305 is optional. As the station 100 is a client/server station, the method of the invention at the time of creation of the collection does not apply: if the label 305 is indicated, its value must necessarily be set to "false".

A physical representation of a collection may for example consist of a coding in XML language:

```
<?xml version="1.0" encoding="utf-8"?>
<COLLECTION
COLLECTION_ID="2c9461ec-0df2-7b4a-9ff0-d17cdca229a7">
<COLLECTION_METADATA>
    <TITLE VALUE="my collection"/>
    <CREATOR UID="a782e3f6-8fb5-9646-abc5-5cac76c099c4"/>
    <ACCESS RESTRICTED="TRUE">
        <RECIPIENT UID="5bca700e-3320-3f49-9d79-efe702336366"/>
    </ACCESS>
    <SIGNATURE VALUE=""/>
<COLLECTION_METADATA>
<IMG CONTENT_ID="f092cefa-ad7f-0a43-9266-c60c7a41b621">
    <METADATA>
```

-continued

```
        <CAPTION VALUE="my_first_image.jpg"/>
        <LABEL VALUE="false"/>
      </METADATA>
    </IMG>
  </COLLECTION>
```

A user wishing to share a collection of images from a terminal 120 may be confronted with limited calculation capacities of this terminal for creating this collection 300. Thus the central server 110 is used as a support for the creation of the collection 300 for the sharing of data from terminals 120. The server 110 will use the label 305 for indicating to the client stations whether the original images are circulating in the P2P network, in order to enable any operations such as searches.

Figure 4:
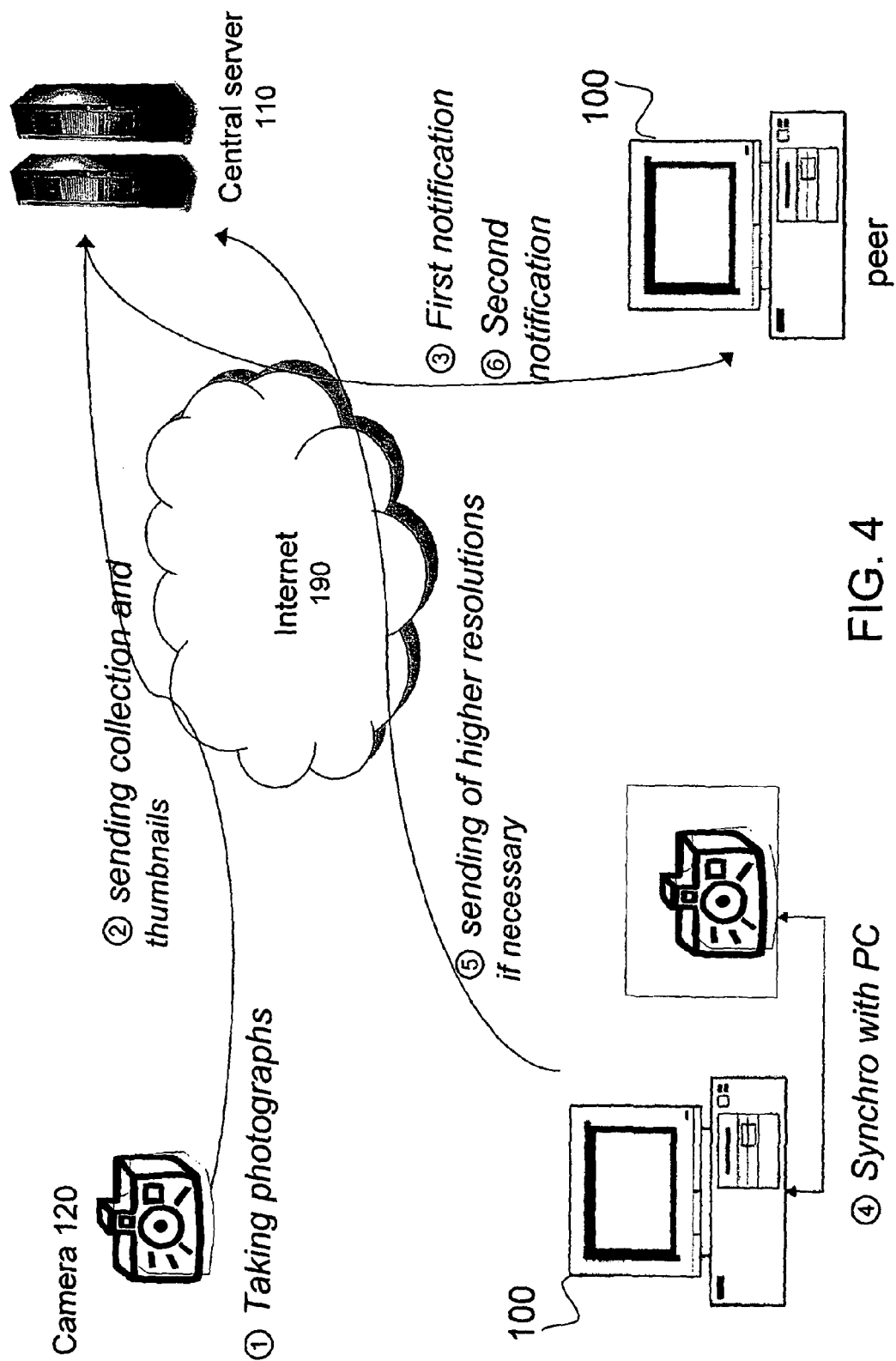
FIG. 4 illustrates a particular embodiment of a scenario for sharing a collection using a camera in a peer to peer network.

FIG. 4 presents a particular embodiment of a normal scenario for sharing digital documents such as photographs from a camera 120 in the peer to peer network, in accordance with the present invention.

A user A takes photographs with his digital apparatus 120 (step 1), which is a lightweight client. This terminal 120 may contain dedicated software for connecting to the central server 110 of the P2P network, or use an Internet browser in order to connect to the Web interface of the server 110.

In a preferred embodiment of the invention, the lightweight client 120 has on-board software enabling him to send messages to the server 110: a message is for example formatted in XML markup language such as SOAP and is transported by the HTTP communication protocol in a request of the POST type.

It should be noted that the client 120 is the initiator of any request on the server 110, since the terminal 120 does not have sufficient capacity to take on board a local server, and thus the server 110 cannot directly interrogate the apparatus 120.

However, the terminal 120 has all the processor capacities for creating at least one limited version, that is to say a thumbnail, of each photographic image captured.

Thus, when it is connected to the Internet by the means described in relation to FIG. 1, the terminal 120 is capable of sending an image-sharing request to the server 110 (step 2).

In a variant, the terminal 120 can itself create the collection, in a similar fashion to the server, as described below in relation to FIG. 5.

In a preferred embodiment, the terminal 120 allocates unique identifiers 303 to the images which will be shared, these identifiers being compatible with the format of the identifiers of the data conveyed in the P2P network. Optionally, these identifiers 303 can be requested of the server 110 by a dedicated request. A new identifier 303 can be created by taking for example a random number with sufficient size to have a very low probability of obtaining the same identifier several times.

The sharing request therefore contains the identifiers 303 of the images to be shared, as well as a few additional metadata to be incorporated in the future collection: the identifier 304 of the owner of the terminal 120, a list of the identifiers 304 of the destinations of this sharing previously selected by the graphical interface of the terminal 120. Optionally, the identifiers 304 of the users can be replaced by electronic messaging addresses. This information may have been entered in advance by the user in the memory of the terminal 120, either by direct entry on the graphical interface of the terminal or by means of software situated on the station 100 during a previous synchronization with the terminal 120.

In a particular embodiment, if the terminal 120 does not have an advanced graphical interface allowing the capture of text, the title of the collection can be composed as required of the current date, the serial number or the trademark of the terminal, or the identifier 304 of the owner. In this case, this information is added to the sharing request sent to the server 110.

Following the reception of the sharing request, the server 110 indicates in its response the list of images that it wishes to receive: it is a case at a minimum of the thumbnails that will serve during the notification of the new shared collection to the destinations. The actions produced by the server 110 (and in particular the creation of the collection C1) are described below in relation to FIG. 5.

In the case where the terminal 120 contains images already partially shared (the case of a previous sharing from this terminal) or completely shared (the case of a previous sharing from this terminal with synchronization made with the station 100, or images received from the P2P network), the server 110 would in its response request only the downloading of the versions of the images (here the thumbnails) which it lacked.

A series of messages then follows, in order to send over the central server 110 the thumbnails requested. These messages are for example HTTP PUT messages. Each message comprises a reference to the collection C1 created on the server, the identifier 303 of the thumbnail and the thumbnail itself.

At the end of the transfer of thumbnails, the server positions the label 305 for each image of the collection C1 coming from the previous transfer.

Next the server 110 notifies the destinations of the current sharing (step 3) for a first time. Performance of this notification is not an object of the invention: it may be a case of a notification internal to the P2P network, but also a notification with external tools (such as electronic messaging or an instantaneous messaging). In both cases, the notification may comprise a thumbnail corresponding to the thumbnail of the first image of this collection, or to a thumbnail representing the first page of the collection. It is possible to transmit the collection C1 as an attachment to the notification message.

One alternative consists, for the central server 110, of sending a simple notification to the destinations indicating that C1 is available on it. In the case of a notification internal to the P2P network, on reception of this notification message, the P2P application can automatically dialogue with the server 110 in order to recover the collection C1 as well as the first versions of the images making up C1. In the case of an external notification, a simple intervention by the user is necessary in order to display the collection C1: he may for example click on a link of the URL type in the notification message, which enables him to start the P2P application or a Web browser on the first page of the collection C1. The precise content of this first notification is described subsequently at step 506 in FIG. 5.

The persons receiving the notification are then in a position to display in low resolution the collection C1 of images that their friend A has just taken.

Secondly, they will be informed of the possibility of obtaining the originals of these shared documents at a second notification. It should be noted that, if the collection C1 contains documents already completely shared on the network, the high-resolution versions of these can of course be obtained from C1 (in this case there is no label 305 in the collection).

In a variant embodiment, in the case where the mobile station 120 has the necessary means for doing it, it performs both the creation of the collection with labels associated with the identifiers of the data, and the notification to the destinations.

Returning home, the user A synchronizes his camera 120 with his personal computer 100 possessing the software for connection to the P2P network (step 4).

This action is performed by connecting the terminal 120 to the USB or serial port of the station 100, or by means of a wireless connection, such as by the WiFi or Bluetooth protocol, for example.

The following steps detail the local synchronization action:
  the terminal 120 downloads the originals of the images onto the PC 100. These originals are automatically referenced in the P2P software by the association with the identifiers 303. Metadata (identifiers 302 of the new collections such as the collection C1, identifiers 303 of the images, address book of the friend destinations) inform the P2P software of the new things. Optionally the thumbnail versions on the terminal 120 are also recovered in order to limit the calculations on the station 100.
  recovery on the network of the collection C1 referenced by 302. If the station 100 is not connected by the Internet to the P2P network, this connection can also be recomposed locally on the station 100.

In both cases, the station 100 now has a collection identical to C1 and of all images necessary for a conventional sharing in the P2P network.

At step 5, a synchronization of the station 100 with the server 110 for the collection C1 is performed. It may be a case of a particular message informing the server 110 that a peer system (the station 100 or the user A) now has original versions of the images of the collection C1 created from a lightweight terminal.

In a preferred embodiment, this message is conveyed to the server 110 as a message creating/sharing a new collection: the advantage is limiting the complexity of the communication interface of the server 110, the latter being responsible for verifying whether the collection to be shared is actually new and to act accordingly (see below the description of FIG. 6).

In response, the server 110 indicates the list of missing images before completing the collection that the peer system 100 must supply to it.

When the station 100 has sent all the missing images to the server 110, the server 110 deletes the labels 305 corresponding to the images received and can validate the collection C1 by incorporating a signature 306 in the collection file.

A second notification is sent to the destinations for the updated collection (step 6). This notification preferably uses the same transmission channel as the first notification, but the content of the message is slightly different: for example, the title of the message indicates that it is a case of an updating of a shared collection but the body of the message may be identical (the link of the URL type to the collection file is the same). A description of the content of the notification is given at step 607 of FIG. 6.

In a preferred embodiment, the second notification can be sent by the peer station 100, in order to relieve the load on the central server 110.

The destinations can then obtain the final collection C1 and profit fully from the P2P services for the shared images from a camera. This is because the new version of the collection no longer comprises any label 305, which indicates that all the original versions of the documents referenced in the collection are introduced into the P2P network.

Figure 5:
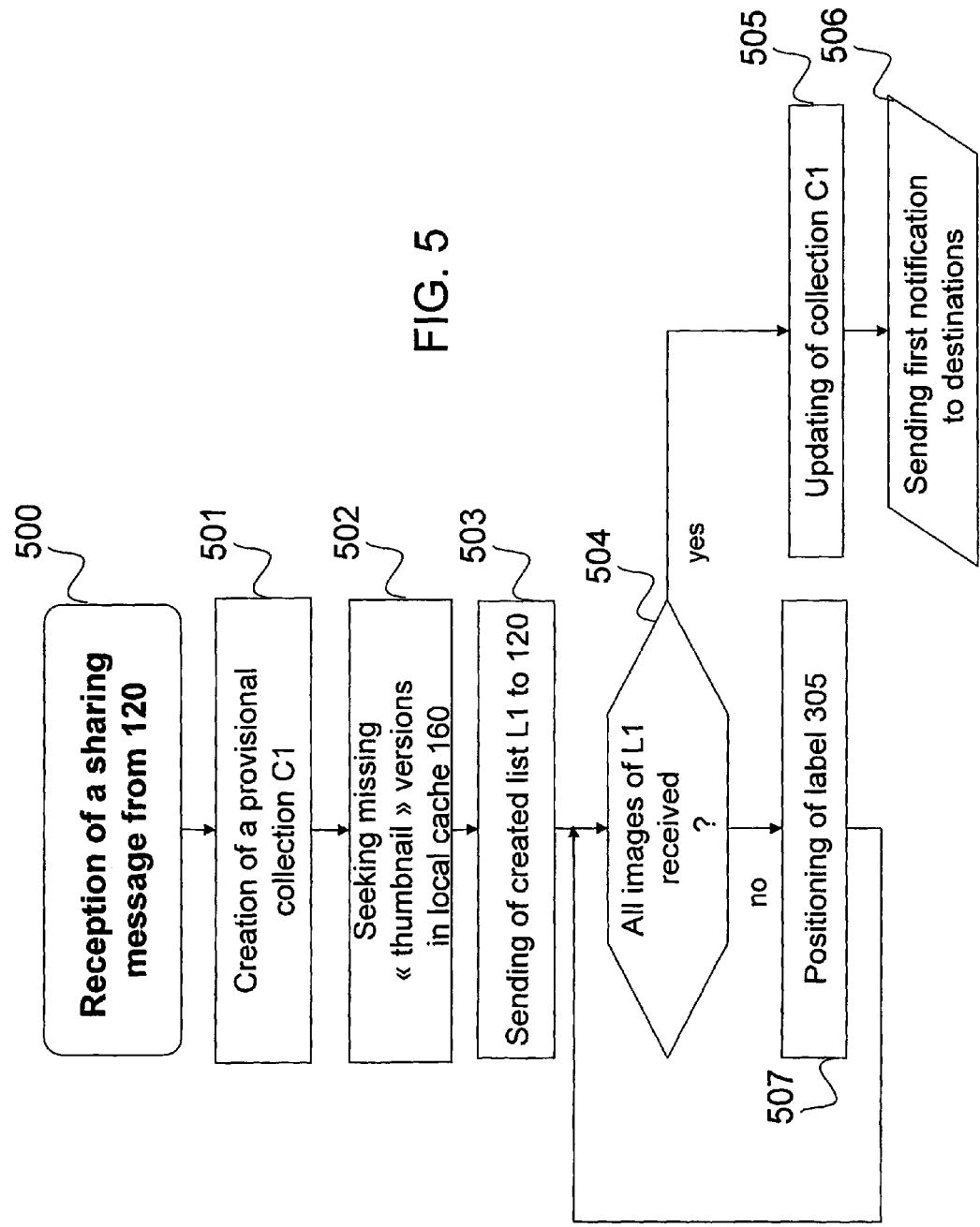
FIG. 5 is a flow diagram illustrating the succession of steps performed in accordance with the present invention on reception of a sharing command from a lightweight client, in a particular embodiment.

The flow diagram in FIG. 5 illustrates the successive steps of the software 130 executed on the central server 110 when a lightweight client system 120 requests a sharing of images, by sending a message containing a sharing request.

This message is preferably formatted in XML language and transported via the SOAP protocol on HTTP. As the lightweight client 120 does not have the capacities for creating a collection locally, the message contains the metadata necessary for the construction of the collection on the server 110.

At step 500, the server 110 receives a list of identifiers of images to be shared as well as metadata specifying the author of the sharing, the destinations and the title of the collection.

At step 501 a temporary collection C1 is created. During a first step, the headers of the collection are created: the title, the identifier of the author and the date of creation. A new collection identifier is created. Next the identifier 303 of each image is added to the new collection. In addition the identifier 304 of each user is added to the new collection.

If the user of the apparatus 120 has entered an electronic messaging address in place of an identifier 304 in order to specify a destination of the sharing, the central server 110 interrogates this database 180 in order to obtain information on this destination. If the destination is a person recorded in the system, the central server allocates to him an identifier 304 that can then be entered in the collection following the other destinations of the collection.

If the electronic messaging address is not contained in the database 180, the field 304 comprises the electronic messaging address of this destination. This address is preferably not entered in clear in the collection: a signature is calculated by a hashing algorithm known per se (for example MD5). Another possibility consists of creating a temporary account for the new destination of the collection, in order to obtain a unique identifier 304 allocated to this electronic messaging address.

At step 502, for each image identifier 303, the new images coming from the appliance 120 are listed (list L1). By analyzing the list of images received, the central server 110 is capable of knowing which are the new images from its data cache 160.

If a thumbnail referenced in the collection is present in the cache 160, it is an image re-shared by the user of the appliance 120.

It should be noted that the terminal 120 can request several sharings to follow concerning the same images. In this case, the thumbnails are already present but these images must however not be considered to be completely available as long as the synchronization with the peer 100 has not been made.

A first solution, for the server 110, consists of keeping a list of the identifiers 303 of the images coming from appliances of the type 120 whose sharing is not terminated. A second solution consists of keeping the list of non-validated collections coming from a particular terminal 120 and verifying that the identifiers 303 received at step 500 do not form part of these collections. A third solution consists of storing in the storage area 160 this information on the partial aspect of the sharing, which will be indicated at each access test on the thumbnail. Thus one solution consists of using a marker file associated with each image/thumbnail. Another solution preferably consists of deducing this partial data information from the absence of a higher resolution version of the image in the storage device 160.

For all these re-shared images coming from the station 120, a label 305 is positioned in the collection C1.

In a particular embodiment the life of the thumbnails in the cache 160 is limited: thus, if thumbnails referenced by an identifier 303 in the collection are not present in the cache 160, the system cannot deduce from this that these images are new. In order to be in a position to verify whether the images are new, the server 110 keeps the list of the image identifiers that it has received coming from the clients. This list of identifiers 303 used in the network can be recorded in a table of the database 180, or just as well in an area of the memory 160 of the server, in which case it will be possible to design the architecture of this area so as to optimize the identifier searches. If the identifiers 303 are not found in this list, the corresponding images are considered to be new and added to the list L1.

At least the thumbnail versions are necessary for starting the sharing. They will serve to offer a minimum display to the destinations of the collection.

At the following step 503, the list L1 is returned to the terminal 120 in response to the request received at step 500. The terminal is then responsible for transmitting the thumbnails requested.

For each thumbnail received, the label 305 of the collection C1 corresponding to the image 303 is positioned (step 505). This label 305 will serve for the peer stations to limit the actions performed on the images concerned.

When all the thumbnails requested are received (test 504 positive), the collection is verified and stored in the memory 160 of the server 110 (step 505). It is therefore available for the peer systems 100 of the network that are authorized to download it.

Next, a notification is sent to the destinations entered in the collection (step 506). This notification can include the collection file or a link of the URL type specifying the location of the file on the server 110. The notification tool (electronic messaging, notification internal to the P2P network, instantaneous messaging) preferably supports an advanced graphical interface allowing the display of a thumbnail representing the collection, namely either the thumbnail of the first image in the list of images, or a thumbnail representing the first page of the collection.

Figure 6:
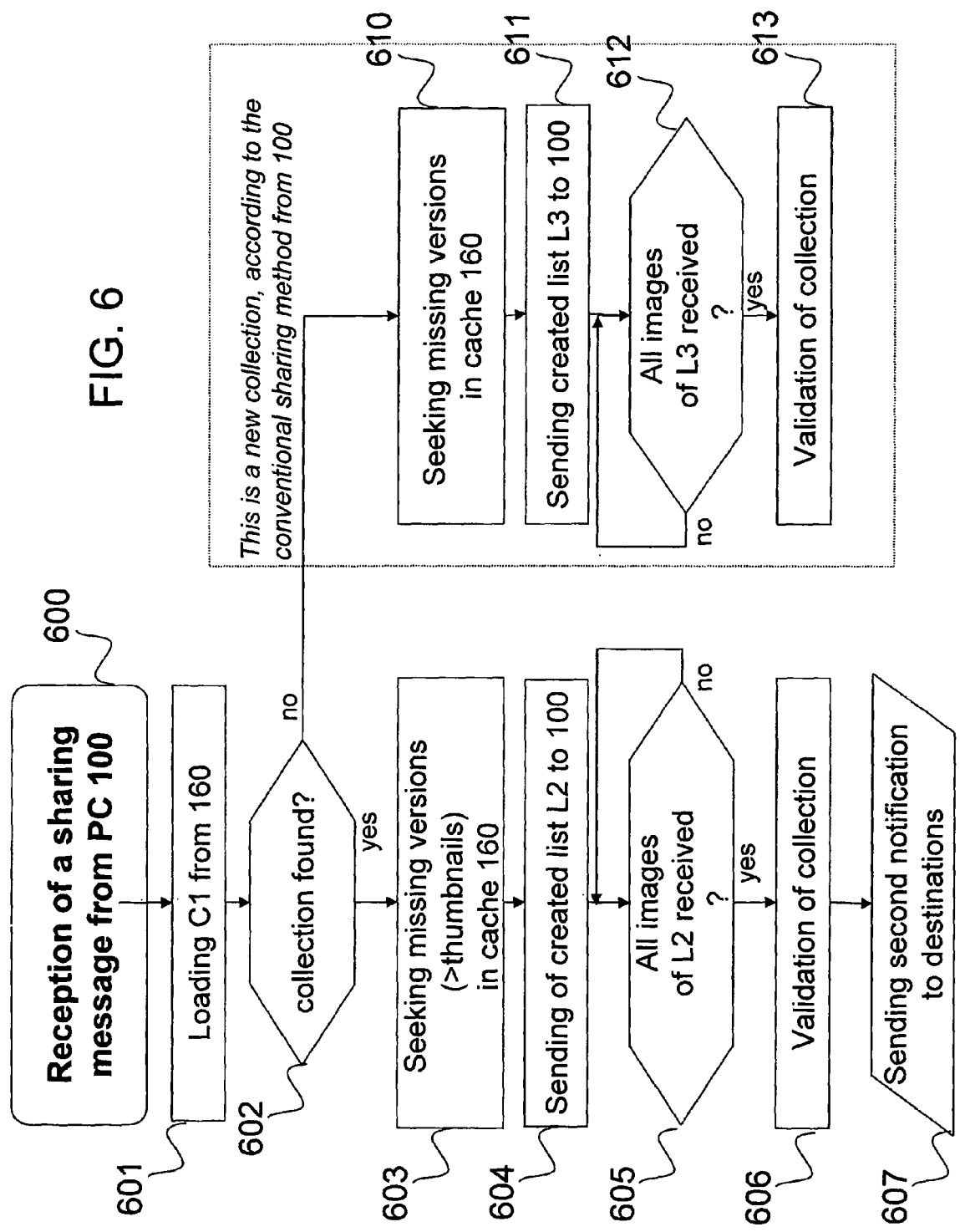
FIG. 6 is a flow diagram illustrating the succession of steps performed in accordance with the present invention on reception of a sharing command from a peer station in a particular embodiment.

The flow diagram in FIG. 6 illustrates the successive steps of the software 130 executed on the central server 110 when a peer client-server system 100 requests a sharing of images.

The message received at step 600 is a conventional message on the sharing of a collection created by a peer station 100: this is because the peer 100 uses the same sharing protocol for a collection C1 coming from a terminal 120 as for a collection created by its own local P2P software.

This message is preferably formatted in XML language and transported by the SOAP protocol on HTTP. The collection created on the peer system 100 will be included equally well in the SOAP message or as an attachment to this message.

In another particular embodiment, it is also possible for the sending of the message from the peer station 100 to be performed by the sending of the collection file in an HTTP message of the PUT or POST type.

Optionally, the message sent contains authentication information on the peer system 100 positioned in the SOAP body or in the http header, so that the server can verify that this peer is authorized to create/modify a/the collection.

The specificity here lies in the fact that the message is used in order to complete a sharing commenced by a lightweight client 120 rather than for sharing a new collection created by the peer 100 as is normally the case. The advantage consists of not multiplying the messages exchanged between the machines in a network and keeping upward compatibility of the communication interfaces.

It should be noted that the messages received at steps 500 (FIG. 5) and 600 (FIG. 6) are preferably distinct. However, when the message corresponds to a SOAP message formatted in XML language, this restriction is in no way obligatory: it is entirely possible for the lightweight client 120 to use the same message, supplying only the information that it is capable of obtaining. The server 110 must thus be capable of identifying the sender of the message, either by the content of the SOAP message (which may contain information on the requesting system), or by information in the HTTP headers (for example, the standard <<User-agent>> label in the HTTP protocol indicates the name of the requesting client system). When this identification is performed by the server 110, the algorithms in FIG. 5 or 6 are then executed.

Thus, when a sharing message is received coming from a station 100, in order to distinguish the two cases of use of the message, the following step 601 consists of verifying that the collection C1 to be shared is already known to the network. If it is not known (test 602 negative), it is a case of a conventional sharing of a new collection, illustrated by steps 610 to 613 described below. If the collection is already known (test 602 positive), it is a case of updating the collection of the network with the new information coming from the peer system 100 (steps 603 to 607).

Optionally, this information on re-sharing a collection initially created from a lightweight client 120 may form part of the sharing message received at step 600.

In order to ensure a minimum of integrity and security check, the collection C1 received is compared with the collection found in the storage device 160: the author must be the same, as well as the broadcast list and the images. This verification is not one of the objects of the invention and is not depicted in FIG. 6. However, it determines the outcome of the test 602 which would lead to an error going back.

In the case of a collection partially shared by a terminal 120, step 603 is executed. The central server seeks for the collection C1 the list L2 of the versions of missing images in order to ensure a minimum service quality on the network. In practice, the server 110 must possess the thumbnails (first display level of an image), which was achieved previously (see FIG. 5), but also higher-resolution versions of the images: for example, an intermediate level may be sufficient before the original version, which would correspond to a 640×480 pixel full screen display. The number of resolution levels is given here by way of non-limiting example and the management policy of the storage device 160 on the server 110 may comprise one or more of these resolution levels.

Next, the list L2, containing the list of identifiers 303 of the images as well as the versions required for these images, is transmitted to the station 100 (step 604).

As the versions of the images are transmitted to the server 110, the latter stores them in the storage device 160. Where the server has managed a non-complete shared data status (see step 502 of FIG. 5), this status is eliminated for each new image whose required resolution versions have all been received.

A necessary condition for the validation of the collection is that all the versions of the images of L2 be present in the storage device 160 (test 605 positive). The validation also consists of eliminating the label 305 associated with the images 303: this indicates to the destination peers that the shared data are now entirely available on the network.

After having validated the collection at step 606, there may be a calculation of a signature 306 of the collection. The signature may be calculated by a conventional public key signature system, such as the RSA: an imprint of the data to be signed is calculated (the author, the list of images 303 and the list of destinations 304) by an algorithm such as MD5 and then this imprint is encrypted with the private key of the central server by the RSA.

The signature (and possibly the updates made in the collection) is then sent back to the peer station 100 of the author of the collection.

The method described thus guarantees the authenticity of data initially shared from a lightweight client 120.

A second notification is sent to the destinations for the validated collection C1 (step 607). This notification is special since it indicates to the peer systems the updating of a collection that they have already received or downloaded. This notification 607 preferably contains an explanatory note enabling the destinations to understand the change made. Where the notification does not include the collection file C1, it should be noted that the URL link indicating the location of this file on the server 110 may be the same as during the notification message of step 506.

Optionally, the central server 110 may request the peer system 100 to make this notification in its place.

Steps 610 to 613 describe the usual procedure for sharing a collection of digital data created on a peer system 100. The server seeks all the versions (including the thumbnails) not locally available in the storage device 160 and necessary to its cache management policy (step 610), and requests the station 100 to supply them to it (list L3) (step 611). Optionally, the server 110 can also request any other peer system 100 to supply the required versions to it.

The sharing client-server system 100 is then informed of the procedure to follow to conclude the validation of the collection: either downloading the missing versions or directly requesting a signature of the collection if all the versions were already present.

The new collection is validated (step 613) provided that all the versions of L3 are transmitted to the central server 110 (test 612 positive). In a preferred embodiment, the unique sharing notification is made by the peer station 100.

Figure 7:
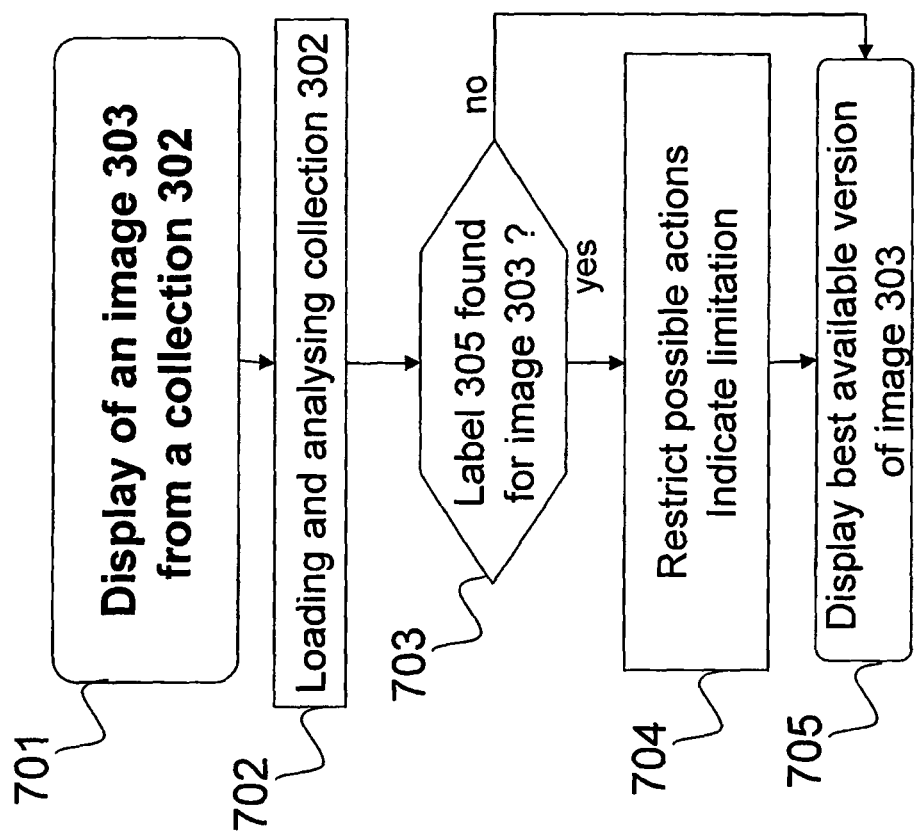
FIG. 7 is a flow diagram illustrating a particular embodiment of a scenario for displaying a collection on a destination station.

The flow diagram in FIG. 7 illustrates the functioning of the peer station 100 that is the destination of a shared collection in accordance with the invention, when the user requests the display of a collection of images (step 701).

The collection is previously loaded from the local storage area. Following the reception of a notification, if the collection does not exist locally it is sought on the P2P network and in particular on the central server 110 using the information contained in the notification message.

The collection is then analyzed (step 702) in order to detect any presence of labels 305 indicating that the chosen image has limited properties. If this label 305 is not found (test 703 negative), it is a case of a normal image and the test 703 leads to a non-limiting display of the image (step 705).

On the other hand, if the label 305 exists, the actions offered by the graphical interface of the P2P software of the station 100 must be limited (step 704). For example, there exists only a thumbnail version of the image on the network and it is therefore not desirable to perform extensive search operations, the outcome of which is known in advance to the system. Thus operations such as local printing (which requires a high-resolution version) or re-sharing in a new collection are not enabled.

In addition, from an ergonomic point of view of the software application, it is preferable to indicate in advance to the user that the current image is not conventional, for example by means of an inhibition icon on one of the edges of the image, with an explanatory note: for example, when the user moves the mouse cursor on the image, a dynamic window informs him that the original version of the image, produced from a digital camera of his friend, has not yet been introduced into the P2P network.

Figure 8:
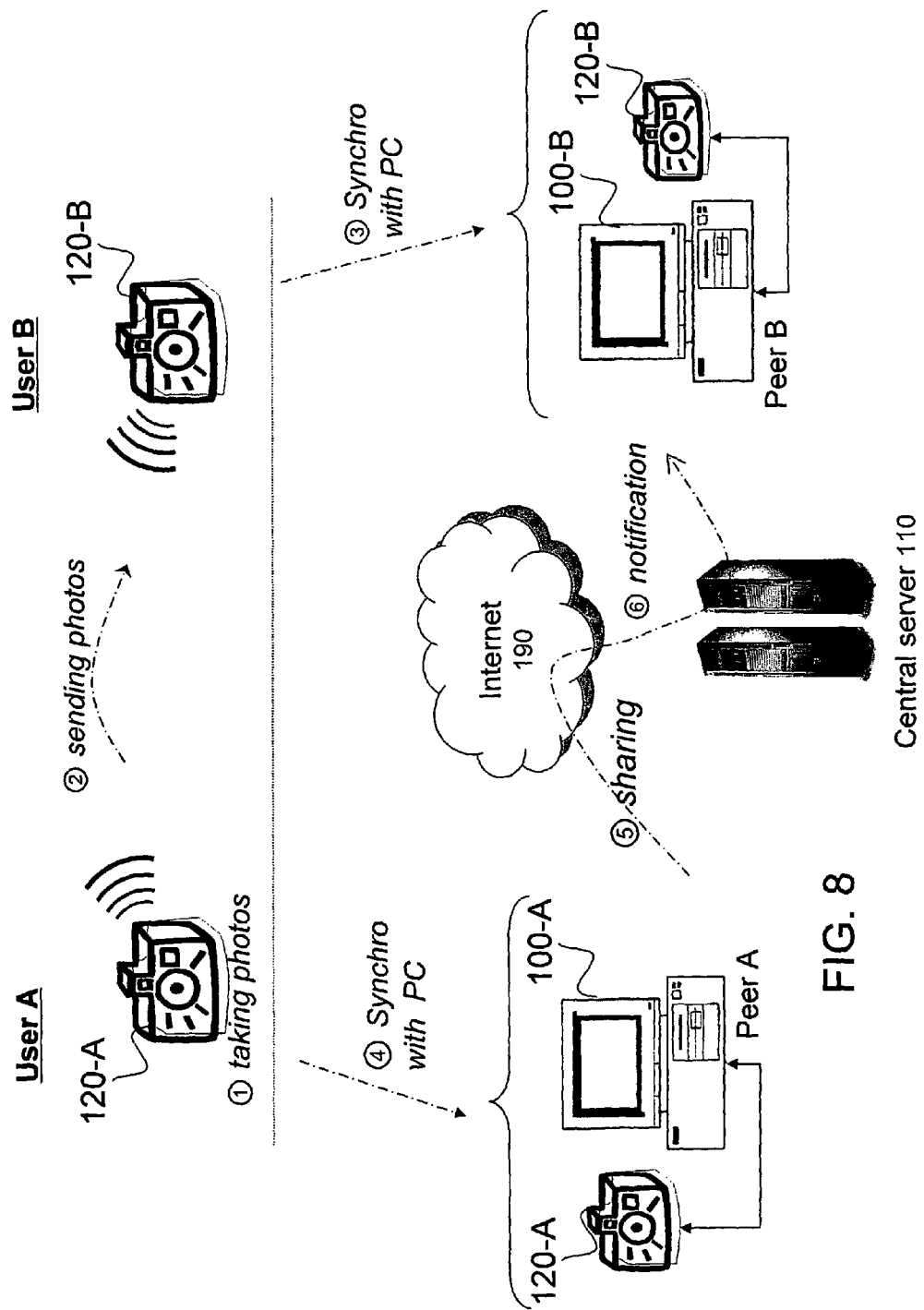
FIG. 8 depicts schematically a peer to peer network adapted to implement the present invention, in a second particular embodiment.

FIG. 8 illustrates a peer to peer network adapted to implement the present invention, in a second particular embodiment. It is a case of a direct sharing between two lightweight clients 120 at the time of an encounter between two users A and B. Later, the destination B of the sharing wishes to obtain, through the peer to peer network, the original versions of the images received in order for example to make paper printings.

At step 1, person A has taken photographs of an event. He wishes to share his images with his friend, user B. Thus, at step 2, user A selects from his appliance 120-A the images to be shared as well as the appliance 120-B of his friend. For example, in the case of an appliance 120 having WiFi connection, the list of appliances present in the local wireless network is sought by the appliance 120-A in order to be able to communicate with these: these devices can then interrogate each other mutually in order to know the identifiers 304 of their owners.

Optionally, the users agree on the version of the images to be transmitted, knowing that the bandwidth capacities on the local link are no doubt limited.

The information exchange protocol between the two appliances 120-A and 120-B does not come under the invention. The information exchanged in addition to the versions of the images concern the identifiers of the users 304, a collection identifier 302 preferably chosen by the appliance 120-A, and the identifiers 303 for the images. Optionally, if the appliance 120-A is not able to create identifiers 304 according to the format of the peer to peer network, the identifiers 303 are replaced by identifiers peculiar to the appliance 120-A.

Next, at step 3, the user B returns to his home and synchronizes his appliance 120-B with his computer PC supporting the software in order to connect to the P2P network. During this synchronization, the peer system 100-B is notified by the appliance 120-B of the presence of a collection shared by the user A: it is a case here also of a notification of the presence of a partial collection.

If the station 100-B is connected on line to the P2P network a search can be carried out to the central server 110 in order to attempt to recover the collection (in the case where the user A is synchronized before B). If this search fails and/or if the station 100-B is not connected, the latter attempts to recreate locally, with the information available to it, a collection corresponding to the sharing of the images which he has just obtained from the appliance 120-B.

As it is a case of a collection whose author is not local to the peer (A is the author) and whose existence on the network is not proved, this collection will be allocated a partial collection status: the station 100-B or the mobile 120-B (before the first notification to the station 100-B) constructs the collection by allocating a label 305 to the images in the collection. This will make it possible to limit the impact of unnecessary actions on the network (searches, etc.) as long as a second notification is not received.

The user B is then capable of displaying locally in low resolution (at least, the resolution chosen during the exchange between the appliances 120-A and 120-B) the collection C1 of images from his friend A on his computer. Later, the user B will be advised of the presence of the original images.

At step 4, when the user A connects his lightweight appliance 120-A to his computer 100-A connected to the P2P network, a local synchronization is executed between the appliance 120-A and the station 100-A as described previously at step 4 in FIG. 4.

This synchronization is followed by a sharing of the collection to the server 110 (step 5). The user A is authorized to add additional information which it has not been possible to enter previously from the appliance 120-A, such as for example a more personalized title or legend for the images selected. On reception of this message at step 5, the central server 110 does not have a partial collection, in which case it executes the actions described at steps 610 to 613 in FIG. 6. At step 6, at the end of this sharing of classical form, a notification is sent to the destinations (here the user B) in order to inform them of the sharing on the network: it is a case here of the notification of a complete collection.

In a particular embodiment, this notification is made by the peer station 100-A since this station knows that the collection comes from an exchange between appliances 120, and the message accompanying the notification can be explained so as to indicate that it is a case of an updating of a collection where the availability of the contents is now total.

Optionally, the central server 110 can be given information on the status of the collection that it receives, in order to propose a suitable information note (for example, <<collection received from A from his camera>>).

Figure 9:
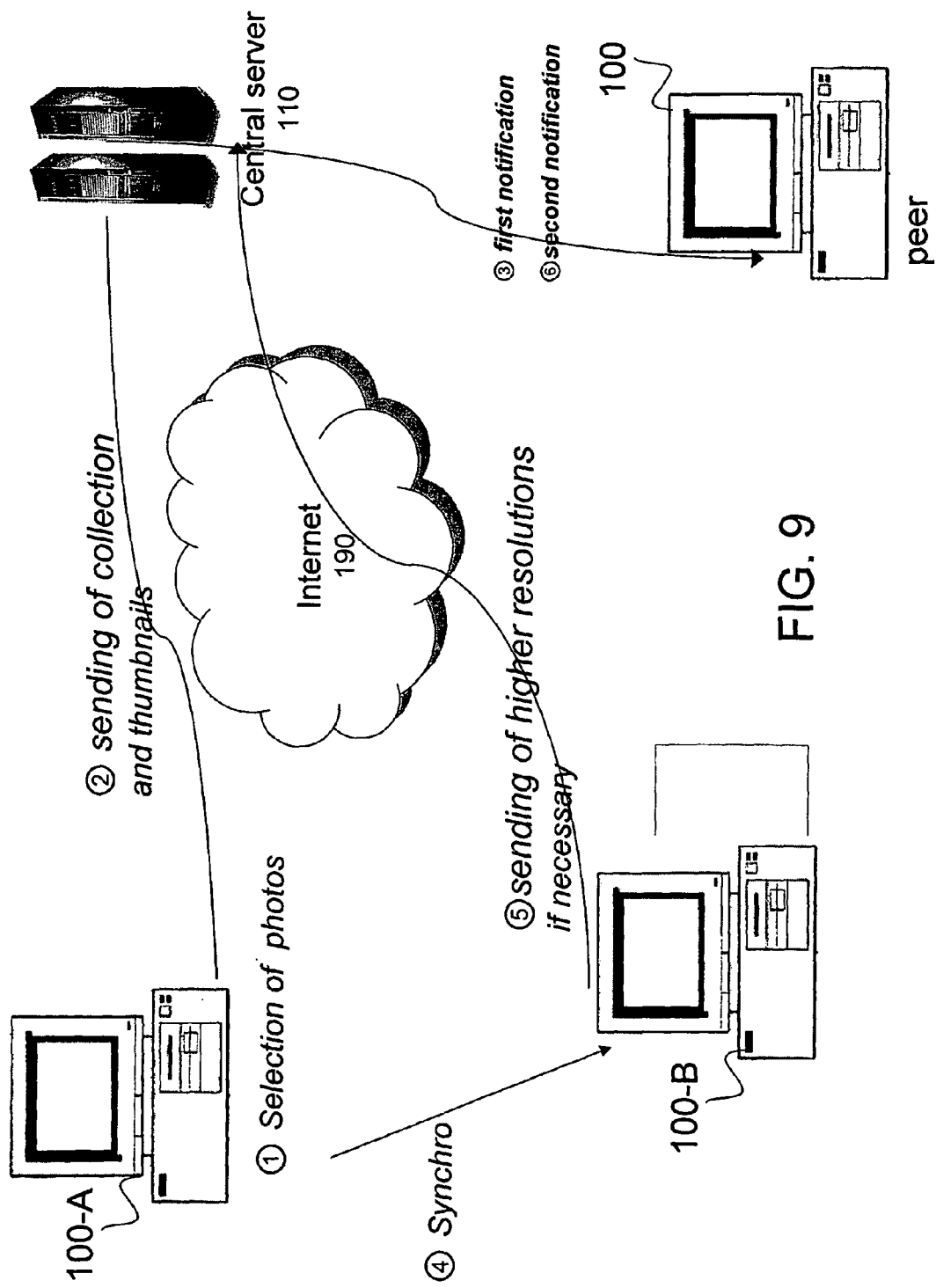
FIG. 9 depicts schematically a peer to peer network adapted to implement the present invention, in other particular embodiments.

FIG. 9 illustrates a peer to peer network adapted to implement the present invention, in variant embodiments. The steps numbered 1 to 6 illustrated in this figure being similar to the steps illustrated in FIG. 4 bearing the same numbers, they are not described in detail again. However, FIG. 9 illustrates scenarios not involving any mobile appliance (or lightweight client).

FIG. 9 illustrates a first case where the peers 100-A and 100-B are distinct machines.

A user of the P2P service creates a collection of images on the peer station 100-A of a friend, or on his own professional machine at his place of work, but does not wish to use this station 100-A as a server. At step 2 he sends only the data necessary for the creation of the partial collection. The original images are stored on a removable disk.

Then, on returning home, on his personal station 100-B, this user at step 4 synchronizes the removable disk with his computer 100-B, which makes the high-resolution versions of the data available to the P2P network.

FIG. 9 also illustrates a second case where the peers 100-A and 100-B are one and the same machine.

Step 4 is in this case a time relationship: at a time t, the peer 100-A/100-B decides to create a collection to be shared quickly and sends only succinct data over the network. Later, when a timer is awakened on execution of a command by the user, the peer 100-A/100-B sends missing data over the network.

In the two cases described previously, the peer 100-A is capable of creating a collection and sending the first notification directly to the destination peers 100 at step 3. The peer 100-B is capable of updating this collection and sending a second notification to the destination peers 100 at step 6.

The invention claimed is:

1. A method of sharing digital data in a peer-to-peer network comprising peer stations which are both client and server stations, said method comprising the following steps:

creating a collection of data for digital data items to be shared, each digital data item having a partial version and a complete version, wherein the partial version of a respective digital data item is present on at least one peer station which is a server station of the peer-to-peer network and is firstly transmitted to stations for which said digital data items are intended;

associating a data identifier with each digital data item and allocating to each data identifier an availability label indicating whether the complete version of the digital data item is present in addition to the partial version on at least one peer station which is a server station of the peer-to-peer network;

notifying the existence of said collection to at least one destination peer station by a first notification; and on reception of availability information indicating that the complete versions of the digital data items of the collection are present on at least one peer station which is a server station of the peer-to-peer network:

updating said collection by updating said availability label associated with each digital data item present on at least one peer station which is a server station of the peer-to-peer network; and notifying the updating of said collection by a second notification to said at least one destination peer station, wherein the partial version of the digital data item has a resolution lower than that of an original.

2. The method according to claim 1, wherein the digital data items represent fixed digital images and the partial version of the digital data items is a version of an image having a resolution lower than that of an original image.

3. The method according to claim 1, wherein the digital data items represent a digital video and the partial version of the digital data items is a first image of the video at a resolution lower than that of an original video.

4. The method according to claim 1, wherein the peer-to-peer network is a hybrid peer-to-peer network further comprising a central server permanently connected to said network, wherein the steps of said method are implemented by the central server.

5. The method according to claim 1, wherein the data collection is created on reception of a request to share digital data coming from a lightweight station, and the reception of information on the availability on the network of the complete versions of the digital data items takes place after connection of said lightweight station with a peer station of the network and on synchronization of the collection between said lightweight station and said peer station.

6. The method according to claim 1, wherein the data collection is created on reception of a request to share digital data coming from a first peer station in the network, and the reception of information on the availability on the network of the complete versions of the digital data items takes place after the making available of complete versions of the digital data items by a second peer station in the network.

7. The method according to claim 1, wherein the steps of creating the collection and of notification of the existence of the collection are implemented by a lightweight station, and the steps of updating the collection and of notification of updating of the collection are performed by a peer station in the network or by a central server permanently connected to said network.

8. The method according to claim 1, wherein all the steps of said method are implemented by a peer station in the network.

9. A method of sharing digital data in a peer-to-peer communication network comprising peer stations which are both client and server stations, a digital data item to be shared having a partial version and a complete version, said method, performed at a destination peer station, comprising the steps of:

receiving a first notification indicating the existence of a collection of data, the notification comprising a data identifier associated with each digital data item, an availability label having been allocated to each data identifier in order to indicate whether the complete version of the digital data item in addition to the partial version is present on at least one peer station which is a server station of the peer-to-peer network, wherein a partial version of the shared digital data item is firstly transmitted to stations for which said digital data items are intended;
analyzing the availability labels associated with the data identifiers for each digital data item of the collection;
in the case where the analyzing step determines the existence of availability labels indicating that the complete version of a digital data item is not present on at least one peer station which is a server station of the peer-to-peer network, restricting processing rights associated with said digital data item so determined; and
on reception of a second notification to update the collection by updating said availability label associated with each digital data item present on at least one peer station which is a server station of the peer-to-peer network, eliminating the restriction of the processing rights,
wherein the partial version of the digital data item has a resolution lower than that of an original.

10. The method according to claim 9, further comprising a step of displaying the restriction of the processing rights.

11. The method according to claim 9, wherein the restriction of the processing rights is a prohibition on requesting a complete version of the digital data item and/or a prohibition on printing the digital data item if the digital data item is an image and/or a prohibition on a new sharing of the digital data item.

12. A device for sharing digital data in a peer-to-peer communication network comprising peer stations which are both client and server stations, said device comprising:
creating means for creating a collection of data for digital data items to be shared, each digital data item having a partial version and a complete version, wherein the partial version of a respective digital data item is present on at least one peer station which is a server station of the peer-to-peer network and firstly transmitted to stations for which said digital data items are intended;
associating means for associating a data identifier with each digital data item and allocating to each data identifier an availability label indicating whether the complete version of the digital data item in addition to the partial version is present on at least one peer station which is a server station of the peer-to-peer network;
first notifying means for notifying the existence of said collection to at least one destination peer station by a first notification;
updating means for, on reception of availability information indicating that the complete versions of the digital data items of the collection are present on at least one peer station which is a sever station of the peer-to-peer network, updating said collection by updating the availability label associated with each digital data item present on at least one peer station which is a server station of the peer-to-peer network; and
second notifying means for notifying the updating of said collection by a second notification to said at least one destination peer station,
wherein the partial version of the digital data item has a resolution lower than that of an original.

13. The device according to claim 12, wherein the digital data items represent fixed digital images and the partial version of the digital data item is a version of an image having a resolution lower than that of an original image.

14. The device according to claim 12, wherein the digital data items represent a digital video and the partial version of a digital data item is a first image of the video at a resolution lower than that of an original video.

15. The device according to claim 12, wherein the creating means creates the collection of data on reception of a request to share digital data coming from a lightweight station, and the reception of information on the availability on the network of the complete versions of the digital data items takes place after connection of said lightweight station with a peer station of the network and on synchronization of the collection between said lightweight station and said peer station.

16. The device according to claim 12, wherein the creating means creates the data collection on reception of a request to share digital data coming from a first peer station in the network, and the reception of information on the availability on the network of the complete versions of the digital data items takes place after making available of complete versions of the digital data items by a second peer station in the network.

17. A device for sharing digital data in a peer-to-peer network comprising peer stations which are both client and server stations, a digital data item to be shared having a partial version and a complete version, in which wherein a partial version of the shared digital data item is present on at least one peer station which is a server station of the peer-to-peer network, said device comprising, at a destination station:
receiving means for analyzing, on reception of receiving a first notification indicating the existence of a data collection, the notification comprising a data identifier associated with each digital data item, an availability label having been allocated to each data identifier in order to indicate whether the complete version of the digital data item in addition to the partial version is present on at least one peer station which is a server station of the peer-to-peer network, wherein a partial version of the shared digital data item is firstly transmitted to stations for which said digital data items are intended;
analyzing means for analyzing the availability labels associated with the data identifiers for each digital data item of the collection;
restricting means for restricting processing rights associated with said digital data item in the case where the analyzing means determines the existence of availability labels indicating that the complete version of a digital data item is not present on at least one peer station which is a server station of the peer-to-peer network; and
eliminating means for, on reception of a second notification to update the collection by updating said availability label associated with each digital data item present on at least one peer station which is a server station of the peer-to-peer network, eliminating the restriction of the processing rights,
wherein the partial version of the digital data item has a resolution lower than that of an original.

18. The device according to claim 17, further comprising display means for displaying the restrictions on the processing rights.

19. The device according to claim 17, wherein the restriction on the processing rights is a prohibition on requesting a complete version of the digital data item and/or a prohibition on printing the digital data item if the digital data item is an image and/or a prohibition on a new sharing of digital data item.

20. A data server in a peer-to-peer communication network, comprising:
storage means for storing data;
a Web server;
a display interface, couple to said Web server;
a database; and a device for sharing digital data in a peer-to-peer communication network comprising peer stations which are both client and server stations, a digital data item to be shared having a partial version and a complete version, in which stations for which said data are intended are adapted to receive, firstly, a partial version of the shared data, said device comprising:
  creating means for creating a collection of data for digital data items to be shared, each digital data item having a partial version and a complete version, wherein the partial version of a respective digital data item is present on at least one peer station which is a server station of the peer-to-peer network and firstly transmitted to stations for which said digital data items are intended;
  associating means for associating a data identifier being associated with each digital data item and allocating to each data identifier an availability label to each data identifier indicating whether the complete version of the digital data item in addition to the partial version is present on at least one peer station which is a server station of the peer-to-peer network;
  first notifying means for notifying the existence of said collection to at least one destination peer station by a first notification;
  updating means for, on reception of availability information indicating that the complete versions of the digital data items of the collection are present on at least one peer station which is a sever station of the peer-to-peer network, updating said collection by updating the availability label associated with each digital data item present on at least one peer station which is a server station of the peer-to-peer network; and
  second notifying means for notifying the updating of said collection by a second notification to said at least one destination peer station,
  wherein the partial version of the digital data item has a resolution lower than that of an original.

21. A non-transitory computer-readable storage medium, that can be read by a computer or a microprocessor, and storing instructions of a computer program that, when executed by a computer, implements a method of sharing digital data in a peer-to-peer network comprising peer stations which are both client and server stations, said method comprising the following steps:
  creating a collection of data for digital data items to be shared, each digital data item having a partial version and a complete version, wherein the partial version of a respective digital data item is present on at least one peer station which is a server station of the peer-to-peer network and is firstly transmitted to stations for which said digital data items are intended;
  associating a data identifier with each digital data item and allocating to each data identifier an availability label indicating whether the complete version of the digital data item is present in addition to the partial version on at least one peer station which is a server station of the peer-to-peer network;
  notifying the existence of said collection to at least one destination peer station by a first notification; and
  on reception of availability information indicating that the complete versions of the digital data items of the collection are present on at least one peer station which is a server station of the peer-to-peer network;
    updating said collection by updating said availability label associated with each digital data item present on at least one peer station which is a server station of the peer-to-peer network; and
    notifying the updating of said collection by a second notification to said at least one destination peer station,
  wherein the partial version of the digital data item has a resolution lower than that of an original.

22. A non-transitory computer-readable storage medium, that can be read by a computer or a microprocessor, and storing instructions of a computer program that, when executed by a computer, implements a method for sharing digital data in a peer-to-peer communication network comprising peer stations which are both client and server stations, a digital data item to be shared having a partial version and a complete version, said method, performed at a destination peer station, comprising the steps of:
  receiving a first notification indicating the existence of a collection of data, the notification comprising a data identifier associated with each digital data item, an availability label having been allocated to each data identifier in order to indicate whether the complete version of the digital data item in addition to the partial version is present on at least one peer station which is a server station of the peer-to-peer network wherein a partial version of the shared digital data item is firstly transmitted to stations for which said digital data items are intended;
  analyzing the availability labels associated with the data identifiers for each digital data item of the collection;
  in the case where the analyzing step determines the existence of availability labels indicating that the complete version of a digital data item is not present on at least one peer station which is a server station of the peer-to-peer network, restricting processing rights associated with said digital data item so determined; and
  on reception of a second notification to update the collection by updating said availability label associated with each digital data item present on at least one peer station which is a server station of the peer-to-peer network, eliminating the restriction of the processing rights,
  wherein the partial version of the digital data item has a resolution lower than that of an original.

* * * * *